United States Patent
Kniesel et al.

(10) Patent No.: US 10,781,303 B2
(45) Date of Patent: *Sep. 22, 2020

(54) HIGH FLOW HETEROPHASIC POLYOLEFIN COMPOSITION HAVING IMPROVED STIFFNESS/IMPACT BALANCE

(71) Applicant: BOREALIS AG, Vienna (AT)

(72) Inventors: Claudia Kniesel, Linz (AT); Minna Aarnio-Winterhof, Altenberg (AT); Karlheinz Friedrich, Weiden am See (AT); Markus Gahleitner, Neuhofen/Krems (AT); Friedrich Berger, Linz (AT)

(73) Assignee: BOREALIS AG (AT)

( * ) Notice: Subject to any disclaimer, the term of this patent is extended or adjusted under 35 U.S.C. 154(b) by 35 days.

This patent is subject to a terminal disclaimer.

(21) Appl. No.: 16/078,573

(22) PCT Filed: Mar. 1, 2017

(86) PCT No.: PCT/EP2017/054684
§ 371 (c)(1),
(2) Date: Aug. 21, 2018

(87) PCT Pub. No.: WO2017/148969
PCT Pub. Date: Sep. 8, 2017

(65) Prior Publication Data
US 2019/0315952 A1    Oct. 17, 2019

(30) Foreign Application Priority Data

Mar. 4, 2016 (EP) .................................. 16158604

(51) Int. Cl.
| C08L 23/12 | (2006.01) |
| C08F 2/00 | (2006.01) |
| C08F 4/646 | (2006.01) |
| C08F 210/16 | (2006.01) |
| C08L 23/16 | (2006.01) |

(52) U.S. Cl.
CPC .............. *C08L 23/12* (2013.01); *C08F 2/001* (2013.01); *C08F 4/6465* (2013.01); *C08F 210/16* (2013.01); *C08L 23/16* (2013.01); *C08F 2500/12* (2013.01); *C08L 2205/025* (2013.01); *C08L 2205/03* (2013.01); *C08L 2207/02* (2013.01)

(58) Field of Classification Search
CPC ...... C08K 5/1345; C08K 5/521; C08K 5/098; C08F 4/6465; C08F 2/001; C08F 210/16; C08F 2500/12; C08F 2500/17; C08L 23/16; C08L 23/20; C08L 23/12; C08L 2205/03; C08L 2207/02; C08L 2205/025; C08L 2205/035

See application file for complete search history.

(56) References Cited

U.S. PATENT DOCUMENTS

2013/0281630 A1* 10/2013 Leskinen et al. ..... C08F 110/06
525/240
2019/0284379 A1* 9/2019 Kniesel et al. ........ C08K 5/098

FOREIGN PATENT DOCUMENTS

| EP | 0491566 A2 | 6/1992 |
| EP | 0586390 B1 | 5/1997 |
| EP | 0591224 B1 | 2/1998 |
| EP | 0887379 A1 | 12/1998 |
| EP | 0887380 A1 | 12/1998 |
| EP | 0887381 A1 | 12/1998 |
| EP | 0991684 B1 | 1/2006 |
| EP | 2338656 A1 | 6/2011 |
| EP | 2431416 61 | 3/2012 |
| EP | 2727958 A1 | 5/2014 |
| KR | 10-2014-0089605 A | 7/2014 |
| WO | 92/12182 A1 | 7/1992 |
| WO | 99/24479 A1 | 10/1994 |
| WO | 99/24478 A1 | 5/1999 |
| WO | 00/68315 A1 | 11/2000 |
| WO | 2004/000899 A1 | 12/2003 |
| WO | 2004/111095 A1 | 12/2004 |
| WO | 2010/049448 A1 | 5/2010 |
| WO | 2010/142540 A1 | 12/2010 |

OTHER PUBLICATIONS

Office action for Korean Patent Application No. 10-2018-7025779, dated Jul. 12, 2019.
Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.
H.N.Cheng, "13C NMR Analysis of Ethylene-Propylene Rubbers", Macromolecules 1984, 17, 1950-1955.
Kakugo et al., "13C NMR Determination of Monomer Sequence Distribution in Ethylene-Propylene Copolymers Prepared with d-TiCl3-Al(C2H5)2Cl" Macromolecules 1982, 15, pp. 1150-1152.
Resconi et al., "Selectivity in Propene Polymerization with Metallocene Catalysts", Chem. Rev. 2000, 100, pp. 1253-1345.
Singh et al., "Triad sequence determination of ethylene-propylene copolymers—application of quantitative 13C NMR", Polymer Testing 28 (2009) pp. 475-479.
Wang et al., "Structural Analysis of Ethylene/Propylene Copolymers Synthesized with a Constrained Geometry Catalyst", Macromolecules 2000, 33, pp. 1157-1162.

(Continued)

*Primary Examiner* — Nathan M Nutter
(74) *Attorney, Agent, or Firm* — Tarolli, Sundheim, Covell & Tummino LLP

(57) ABSTRACT

High flow nucleated heterophasic polyolefin compositions comprising a matrix comprising a propylene homo- and/or copolymer and an elastomeric alpha-olefin copolymer phase dispersed in the matrix, which have rather high melt flow rate, improved impact strength but also an excellent impact/stiffness balance and a process for the preparation of such a heterophasic polyolefin composition, articles made therefrom and uses of the heterophasic polyolefin composition.

15 Claims, 1 Drawing Sheet

(56) References Cited

OTHER PUBLICATIONS

Zhou et al., "A new decoupling method for accurate quantification of polyethylene copolymer composition and triad sequence distribution with 13C NMR", Journal of Magnetic Resonance 187 (2007) pp. 225-233.
Busico et al., "Microstructure of polypropylene", Prog. Polym. Sci. 26 (2001) 443-533.
Busico et al., "Full Assignment of the 13C NMR Spectra of Regioregular Polypropylenes: Methyl and Methylene Region", Macromolecules 1997, 30, 6251-6263.

* cited by examiner

HIGH FLOW HETEROPHASIC POLYOLEFIN COMPOSITION HAVING IMPROVED STIFFNESS/IMPACT BALANCE

The present invention relates to a heterophasic polyolefin composition comprising a matrix comprising a propylene homo- and/or copolymer and an elastomeric alpha-olefin copolymer phase dispersed in the matrix having improved flowability and impact strength but also an excellent impact/stiffness balance. The present invention further relates to a process for the preparation of such a heterophasic polyolefin composition, articles made therefrom and uses of the heterophasic polyolefin composition.

Polymers, like polypropylene, are increasingly used in different demanding applications. At the same time there is a continuous search for tailored polymers which meet the requirements of these applications. The demands can be challenging, since many polymer properties are directly or indirectly interrelated, i.e. improving a specific property can only be accomplished on the expense of another property. Stiffness can for instance be improved by increasing the crystallinity and/or the relative amount of homopolymer within the composition. As a consequence, the material becomes more brittle, thereby resulting in poor impact properties. It is known that impact strength of polypropylene can be improved by dispersing a rubber phase within the polymer matrix, thereby obtaining a heterophasic polypropylene composition.

It is known that impact strength of polypropylene can be improved by dispersing a rubber phase within the polymer matrix, thereby obtaining a heterophasic polypropylene composition.

There is an increasing market need for light-weight consumer packaging which can be manufactured with lower wall thicknesses, since it allows for energy and material savings. In order to provide a material equipped with these features, a highly stiff material with good impact properties needs to be developed. The high stiffness enables lower wall thicknesses of a packaging article.

Furthermore, cycle time reduction is possible since a certain stiffness needed for demoulding of the specimen is reached at shorter cooling times.

Additionally, the materials should show high flowability. Otherwise, injection moulding of specimen with thin wall thickness is not possible. High flow materials generally show high stiffness due to shorter polymer chains of high stereoregularity. However, the impact performance becomes reduced due to shorter polymer chains which form less entanglement. Thus, the challenge is to obtain a material, i.e. a heterophasic polyolefin composition of high flowability and high stiffness/impact balance.

Such heterophasic propylene copolymers comprise a matrix being either a propylene homopolymer or a random propylene copolymer in which an amorphous phase containing a propylene copolymer rubber (elastomer) is dispersed. Thus the polypropylene matrix contains (finely) dispersed inclusions not being part of the matrix and said inclusions contain the elastomer. The term inclusion indicates that the matrix and the inclusion form different phases within the heterophasic propylene copolymer, said inclusions are for instance visible by high resolution microscopy, like electron microscopy or scanning force microscopy or atomic force microscopy, or by dynamic mechanical thermal analysis (DMTA). Further the heterophasic polypropylene may contain to some extent a crystalline polyethylene, which is a by-reaction product obtained by the preparation of the heterophasic propylene copolymer. Such crystalline polyethylene is present as inclusion of the amorphous phase due to thermodynamic reasons.

Many different types of heterophasic systems have been described depending on the individual requirements.

EP 2431416 A1, for example, relates to a polypropylene composition having an MFR (230° C./2.16 kg) of ≥15 g/10 min comprising (a) a crystalline polypropylene matrix (b) an elastomeric propylene copolymer phase having a propylene content in the range of 40 to 80 wt %, and an intrinsic viscosity in the range of more than 0.7 to less or equal 2.5 dl/g, (c) a first polyethylene having a density in the range 905 to 925 kg/m 3 and an MFR (190° C./2.16 kg) of ≤30 g/10 min, (d) a second polyethylene having a density of above 915 kg/m 3, and an MFR (190° C./2.16 kg) of ≥30 g/10 min. The patent does not mention any nucleating agents and requires the presence of two PE components to improve impact behaviour.

From WO 2010/049448 further heterophasic propylene copolymers are known. These high purity heterophasic propylene copolymers are prepared with a multi-step polymerization procedure in the presence of a special Ziegler-Natta procatalyst which contains a trans-esterification product of a lower alcohol and a phthalic ester in combination with a special external donor. The products described in this application however have limited impact strength.

EP 2338656 A1 describes a heterophasic polypropylene composition comprising at least a propylene homopolymer fraction, a propylene random copolymer fraction, two different ethylene-propylene rubber fractions and an ethylene homo- or copolymer fraction and being prepared with a multi-step polymerization procedure in the presence of a special Ziegler-Natta procatalyst which contains a trans-esterification product of a lower alcohol and a phthalic ester in combination with a special external donor. The application does not use a polymeric nucleating agent.

However, up to now the mechanical properties of heterophasic polypropylene composition did not fulfill all the desired requirements, especially in view of stiffness/impact-balance.

Therefore there is still a need for heterophasic polypropylene compositions, which show high flowability and an improved impact/stiffness balance and are especially suitable for thin wall injection moulded applications.

Hence, it is an object of the present invention to provide such a material.

It is a further object to provide a polypropylene composition obtainable by a multiple reaction stage process having the above mentioned unique property balance.

The present invention is based on the finding that the above object can be achieved by a nucleated heterophasic polyolefin composition with rather high melt flow rate, comprising specific matrix and rubber design.

So the present invention concerns a nucleated polypropylene composition and articles produced thereof which fulfil the higher stiffness-impact-requirements and preferably also the legal and health and environmental requirements.

The present invention in a special embodiment deals also with polymerization method, suitable for the production of the nucleated polypropylene composition.

SUMMARY OF THE INVENTION

The present invention is directed to a heterophasic propylene copolymer (HECO) comprising
(a) a matrix (M) being a polypropylene (PP), said polypropylene (PP) comprises at least two polypropylene fractions (PP1) and (PP2) and optionally a third polypropylene fraction (PP3), and having a matrix melt flow rate (MFR$_M$) as determined at 230° C. and 2.16 kg load according ISO 1133 in the range of 50.0 to 1000.0 g/10 min and (b) an elastomeric propylene copolymer (EPC) being a copolymer of propylene and ethylene and/or an α-olefin with 4-10 carbon atoms and being dispersed in said matrix (M), said elastomeric propylene copolymer (EPC) comprises at least one propylene copolymer fractions (EPC1) and optionally a second propylene copolymer fraction (EPC2), wherein the elastomeric propylene copolymer (EC) is the xylene cold soluble fraction (XCS) determined at 25° C. according ISO 16152 of the heterophasic propylene copolymer (HECO) and has an intrinsic viscosity (iV) measured according to ISO 1628-1 (at 135° C. in decaline) in the range of 2.0 dl/g-4.0 dl/g.

(c) optionally a crystalline ethylene copolymer (CEC) with an α-olefin with 3-10 carbon atoms being present in the composition as inclusions of the dispersed particles of (b), and (d) a polymeric nucleating agent (PNA), (i) said heterophasic propylene copolymer (HECO) has a total melt flow rate (MFR$_T$) (230° C.) measured according to ISO 1133 in the range of 25.0 g/10 min to 250 g/10 min.

The special combination of especially Components (a), (b) and (d), gives rise to compositions having improved stiffness/impact balance compared to other heterophasic polypropylene compositions.

In a first embodiment of the present invention, the heterophasic polypropylene composition comprises (a) a matrix (M) being a polypropylene (PP), said polypropylene (PP) comprises three polypropylene fractions (PP1), (PP2) and a third polypropylene fraction (PP3), whereby the polypropylene (PP) is a random propylene copolymer (R-PP) or a propylene homopolymer (HPP), the latter being preferred and (b) an elastomeric propylene copolymer (EPC) being a copolymer of propylene and ethylene and/or an α-olefin with 4-10 carbon atoms and being dispersed in said matrix (M), said elastomeric propylene copolymer (EPC) comprises only one propylene copolymer fractions (EPC1), (c) optionally a crystalline ethylene copolymer (CEC) with an α-olefin with 3-10 carbon atoms being present in the composition as inclusions of the dispersed particles of (b), and (d) a polymeric nucleating agent (PNA).

In a further embodiment the present invention, the heterophasic polypropylene composition comprises (a) a matrix (M) being a polypropylene (PP), said polypropylene (PP) comprises two polypropylene fractions (PP1) and (PP2), whereby the polypropylene (PP) is a random propylene copolymer (R-PP) or a propylene homopolymer (HPP), the latter being preferred and (b) an elastomeric propylene copolymer (EPC) being a copolymer of propylene and ethylene and/or an α-olefin with 4-10 carbon atoms and being dispersed in said matrix (M), said elastomeric propylene copolymer (EPC) comprises (b-1) either only one propylene copolymer fractions (EPC1) or (b-2) two propylene copolymer fractions (EPC1) and (EPC2), (c) optionally a crystalline ethylene copolymer (CEC) with an α-olefin with 3-10 carbon atoms being present in the composition as inclusions of the dispersed particles of (b), and (d) a polymeric nucleating agent (PNA).

The present invention further relates to a process for the production of the above heterophasic propylene polymer composition, comprising polymerizing propylene in at least 3 subsequent polymerization steps in the presence of a Ziegler-Natta catalyst and introducing the polymeric nucleating agent either in a prepolymerization step or in the form of a masterbatch (MB) together with e.g. a carrier polymer.

In a further aspect the invention is related to the use of the composition for the production of films, extruded, blow moulded or injection moulded articles, such as pouches and bags, pipes and fittings, transport packaging containers as well as components for car exteriors and interiors, like dashboards, door claddings, consoles, bumpers and trims.

DETAILED DESCRIPTION

Figure 1:
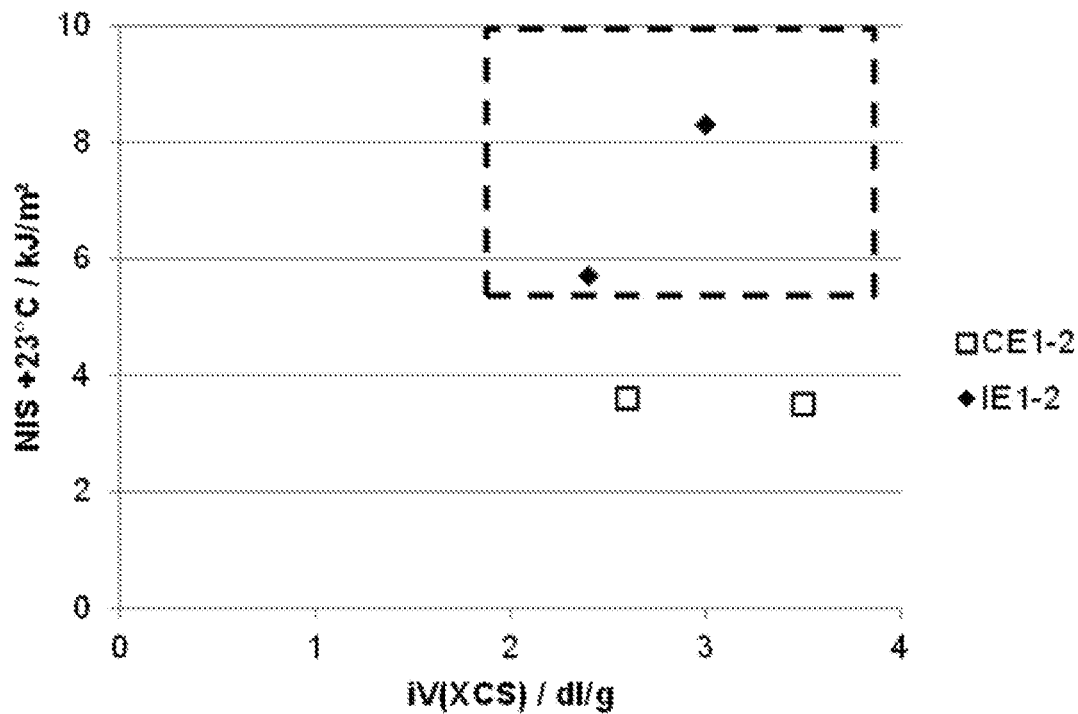
FIG. 1 demonstrates the higher impact strength at comparable iV(XCS) for the inventive example IE1 to IE 2 compared to CE1 to CE2.

In the following the individual components are defined in more detail.

The particular heterophasic polypropylene composition of the present invention comprises at least (a) the matrix (M) being a polypropylene (PP)
(b) the elastomeric propylene copolymer (EPC) dispersed in said matrix (M); and
(d) the polymeric nucleating agent, and
optionally component (c) crystalline ethylene copolymer (CEC),
as defined in more detail below.

The term "heterophasic polypropylene composition" used herein denotes compositions consisting of a polypropylene matrix resin and an elastomeric propylene copolymer dispersed in said matrix resin and a polymeric nucleating agent.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene homo- or copolymer is present in such an amount that it can form a continuous phase which can act as a matrix.

Furthermore the terms "elastomeric propylene copolymer (EPC)", "xylene cold soluble (XCS) fraction of the heterophasic propylene copolymer", "dispersed phase" and "ethylene-propylene rubber" denote the same, i.e. are interchangeable.

Ad Component (A):

As indicated above the polypropylene (PP) comprises at least two and optionally three polypropylene fractions (PP1), (PP2), and (PP3).

Variant (I):

As indicated already above in one embodiment it is preferred that the matrix polypropylene (PP) comprises three polypropylene fractions (PP1), (PP2), and (PP3).

In this case the matrix (M), i.e. the polypropylene (PP) of the heterophasic propylene copolymer (HECO) comprises, preferably consist of, (a-1) a first polypropylene fraction (PP1) being a first propylene homopolymer (H-PP1) or a first random propylene copolymer (R-PP1), (a-2) a second polypropylene fraction (PP2) being a second propylene homopolymer (H-PP2) or a second random propylene copolymer (R-PP2),
(a-3) a third polypropylene fraction (PP3) being a third propylene homopolymer (H-PP3) or a third random propylene copolymer (R-PP3),
whereby at least one of the three fractions (PP1), (PP2) and (PP3) is a propylene homopolymer, preferably at least the first polypropylene fraction (PP1) is a propylene homopolymer, more preferably the first polypropylene fraction (PP1) and the second polypropylene fraction (PP2) are propylene homopolymers and most preferably all three propylene fractions (PP1), (PP2) and (PP3) are propylene homopolymers.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable.

In Variant (I) the three polypropylene fractions (PP1), (PP2), and (PP3) differ from each other by the melt flow rate MFR2 (230° C.) measured according to ISO 1133.

One of the three polypropylene fractions (PP1), (PP2), and (PP3), preferably the third polypropylene fraction (PP3), has a melt flow rate MFR2 (230° C.) measured according to ISO 1133 in the range of 2.0 to 22.0 g/10 min, preferably in the range of 2.5 to 20.0 g/10 min, still more preferably in the range of 3.0 to 18.0 g/10 min. Still more preferably the polypropylene fraction with the melt flow rate MFR2 (230° C.) measured according to ISO 1133 in the range of 2.0 to 22.0 g/10 min, i.e. in the range of 2.5 to 20.0 g/10 min, like in the range of 3.0 to 18.0 g/10 min, is the polypropylene fraction with the lowest melt flow rate MFR2 (230° C.) of the three polypropylene fractions (PP1), (PP2) and (PP3), preferably of all polypropylene fractions present, of the polypropylene (PP). Accordingly in one preferred embodiment the third polypropylene fraction (PP3) has the lowest melt flow rate MFR2 (230° C.) of the three polypropylene fractions (PP1), (PP2), and (PP3), wherein the melt flow rate MFR2 (230° C.) measured according to ISO 1133 of the third polypropylene fraction (PP3) is in the range of 2.0 to 22.0 g/10 min, preferably in the range of 2.5 to 20.0 g/10 min, still more preferably in the range of 3.0 to 18.0 g/10 min.

In addition to the requirement that one of the three polypropylene fractions (PP1), (PP2) and (PP3) must have a melt flow rate MFR2 (230° C.) measured according to ISO 1133 in the range of 2.0 to 22.0 g/10 min it is preferred that another fraction of the three polypropylene fractions (PP1), (PP2) and (PP3) has a melt flow rate MFR2 (230° C.) measured according to ISO 1133 in the range of 80.0 to 500.0 g/10 min, preferably in the range of 120.0 to 450.0 g/10 min, more preferably in the range of 150.0 to 450.0 g/10 min. Particularly the first polypropylene fraction (PP1) has a melt flow rate MFR2 (230° C.) measured according to ISO 1133 in the range of 80.0 to 500.0 g/10 min, preferably in the range of 120.0 to 450.0 g/10 min, more preferably in the range of 150.0 to 450.0 g/10 min.

In one preferred embodiment the remaining polypropylene fraction of the three polypropylene fractions (PP1), (PP2) and (PP3), preferably the second polypropylene fraction (PP2), has a melt flow rate MFR2 (230° C.) measured according to ISO 1133 in the range of 10.0 to 300.0 g/10 min, preferably in the range of 20.0 to 250.0 g/10 min, more preferably in the range of 30.0 to 200.0 g/10 min.

Thus the matrix (M) of Variant (I) is multimodal, i.e. trimodal. It preferably contains the three fractions (PP1), (PP2), and (PP3) in certain amounts. Fraction (PP1) is preferably present in an amount of 30.0 to 45.0 wt %, fraction (PP2) is preferably in present in an amount of 25.0 to 40.0 wt % and fraction (PP3) present in an amount of in 5.0 to 20.0 wt %, all weight percentages related to the matrix and summing up to 100% of the matrix.

"Multimodal", like "bimodal" or "trimodal" describes a probability distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in a sequential step process, i.e. by utilizing reactors coupled in serial configuration, and using different conditions in each reactor, the different polymer fractions produced in the different reactors have each their own molecular weight distribution which may considerably differ from one another. The molecular weight distribution curve of the resulting final polymer can be seen as super-imposing of molecular weight distribution curves of the individual polymer fractions which will, accordingly, show distinct maxima, or at least be distinctively broadened compared with the curves for individual fractions. A polymer showing such molecular weight distribution curve is called bimodal, trimodal or multimodal, respectively.

Variant (II)

In this embodiment it is preferred that the matrix (M) comprises two polypropylene fractions (PP1) and (PP2).

In this case the matrix (M), i.e. the polypropylene (PP) of the heterophasic propylene copolymer (HECO) comprises, preferably consist of,
(a-1) a first polypropylene fraction (PP1) being a first propylene homopolymer (H-PP1) or a first random propylene copolymer (R-PP1) and
(a-2) a second polypropylene fraction (PP2) being a second propylene homopolymer (H-PP2) or a second random propylene copolymer (R-PP2),
whereby at least one of the two fractions (PP1) and (PP2) is a propylene homopolymer, preferably at least the first polypropylene fraction (PP1) is a propylene homopolymer, more preferably the first polypropylene fraction (PP1) and the second polypropylene fraction (PP2) are propylene homopolymers.

The polypropylene constituting the matrix in this case can be unimodal or multimodal, e.g. bimodal. Preferably the matrix is bimodal, meaning that the first polypropylene fraction (PP1) and the second polypropylene fraction (PP2) differ at least in their melt flow rate, optionally also in their comonomer content. According to one preferred embodiment, the melt flow rate of the (PP1) fraction is higher than the melt flow rate of the (PP2) fraction, the ratio MFR(PP1)/MFR(PP2) being in the range of 2 to 10.

The propylene homo- or copolymer (PP) constituting the matrix for Variant I or Variant II may be produced by a single- or multistage process polymerization of propylene or propylene with alpha-olefin and/or ethylene such as bulk polymerization, gas phase polymerization, solution polymerization or combinations thereof, using conventional catalysts. A homo- or copolymer can be made either in loop reactors or in a combination of loop and gas phase reactors. Those processes are well known to one skilled in the art.

As stated above in both cases the matrix (M) is preferably a propylene homopolymer.

When the propylene homopolymer matrix phase is unimodal with respect to the molecular weight distribution, it may be prepared in a single stage process e.g. a slurry (or bulk) or gas phase process in a slurry or gas phase reactor. Thus, a unimodal matrix phase may be polymerized in a slurry polymerization step only. Alternatively, the unimodal matrix may be produced in a multistage process (e.g. combination of slurry and gas phase) using at each stage process conditions which result in similar polymer properties.

The propylene homopolymer matrix, if it is of multimodal or bimodal character, can be produced by blending different polymer types, i.e. of different molecular weight and/or comonomer content. However in such a case it is preferred that the polymer components of the polypropylene matrix are produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

The propylene homopolymer matrix has a melt flow rate $MFR_2$ (ISO 1133; 230° C.; 2.16 kg) in the range of 50.0 to 1000.0 g/10 min, preferably in the range of 55.0 to 700.0 g/10 min and more preferably in the range of 60.0 to 500.0 g/10 min.

The $MFR_2$ of the matrix is named matrix melt flow rate ($MFR_M$).

Moreover it is preferred that the amount of xylene solubles of the propylene homopolymer matrix is not too high. Xylene solubles are the part of the polymer soluble in cold xylene determined by dissolution in boiling xylene and letting the insoluble part crystallize from the cooling solution (determined at 25° C. according to ISO 16152). The xylene solubles fraction contains polymer chains of low stereo-regularity and is an indication for the amount of non-crystalline areas. Accordingly it is preferred that the xylene solubles fraction of the propylene homopolymer matrix is in the range of 0.5 wt % to 4.5 wt %, more preferably in the range of 0.7 wt % to 4.0 wt %. In an even more preferred embodiment the xylene solubles fraction is in the range of 0.8 wt % to 3.5 wt %.

The propylene homopolymer has a melting temperature $T_{m1}$ as determined by DSC analysis according to ISO 11357.

Preferably, $T_{m1}$ of the propylene homopolymer is within the range of 160° C. to 170° C., more preferably within the range of 161° C. to 169° C. and most preferably within the range of 162° C. to 168° C.

As stated above, the propylene homopolymer matrix can be unimodal or multimodal, like bimodal or trimodal.

Concerning the definition of unimodal and multimodal, like bimodal or trimodal, it is referred to the definition above.

Ad Component (b):

Component b) is an elastomeric propylene copolymer (EPC), which is a copolymer of propylene and ethylene and/or an α-olefin with 4-10 carbon atoms being dispersed in said matrix (M) (i.e. dispersed phase), and said elastomeric propylene copolymer (EPC) comprises at least one propylene copolymer fractions (EPC1) and optionally a second propylene copolymer fraction (EPC2).

Component (b) of the particular heterophasic polypropylene composition is a predominantly amorphous propylene copolymer.

In general the elastomeric propylene copolymer (EPC) comprises copolymers of propylene and ethylene or propylene and an α-olefin with 4-10 carbon atoms, like 1-butene or 1-hexene.

Preferably the elastomeric propylene copolymer (EPC) is a copolymer of propylene and ethylene.

The elastomeric propylene copolymer (EPC) has a total comonomer content, preferably total ethylene content, in the range of 25.0 to 48.0 wt %, preferably in the range of 30.0 to 46.0 wt % and more preferably in the range of 32.0 to 45.0 wt %.

As stated above, the terms "elastomeric propylene copolymer (EPC)", "xylene cold soluble (XCS) fraction of the heterophasic propylene copolymer", "dispersed phase" and "ethylene-propylene rubber" denote the same, i.e. are interchangeable.

Thus the amount of elastomeric propylene copolymer (EPC) constitutes the amount of the xylene cold soluble (XCS) fraction of the heterophasic propylene copolymer, which is in the range of 10.0 to 30.0 wt % in view of the heterophasic propylene copolymer, preferably in the range of 12.0 to 28.0 wt % and more preferably in the range of 15.0 to 25.0 wt %.

The intrinsic viscosity (IV) measured according to ISO 1628-1 (at 135° C. in decaline) of the XCS fraction is in the range of 1.8 to 4.0 dl/g, preferably in the range of 2.0 to 3.8 dl/g and more preferably in the range of 2.2 to 3.6 dl/g.

Like the propylene homopolymer matrix, the dispersed phase can be unimodal or multimodal, like bimodal.

In one embodiment, the dispersed phase is unimodal. More particularly, the dispersed phase is preferably unimodal in view of the intrinsic viscosity and/or the comonomer distribution. Concerning the definition of unimodal and multimodal, like bimodal, it is referred to the definition above.

Preferably the unimodal dispersed phase is made in one reaction stage, more preferably in a gas phase reactor ad comprises, respectively consists of one propylene copolymer fractions (EPC1).

In another embodiment the dispersed phase comprises, preferably consists of two fractions, e.g. one propylene copolymer fractions (EPC1) and a second propylene copolymer fraction (EPC2).

These two fractions are preferably in-situ blended. The fractions (EPC1) and (EPC2) are preferably obtainable as described later.

In this case the two fractions (EPC1) and (EPC2) differ in view of the intrinsic viscosity and/or the comonomer distribution.

Preferably, the first elastomeric propylene copolymer fractions (EPC1) has a comonomer content in the range of 20.0-35.0 wt %, more preferably, in the range 22.0-32.0 wt % and most preferably in the range of 24.0-30.0 wt %.

Preferably, the first elastomeric propylene copolymer fractions (EPC1) has an intrinsic viscosity (iV) measured according to ISO 1628-1 (at 135° C. in decaline) of 2.0-3.2 dl/g, more preferably of 2.2-3.1 dl/g still more preferably of 2.4-3.0 dl/g.

The second elastomeric propylene copolymer fractions (EPC2) preferably has a comonomer content in the range of 35.0-60.0 wt %, more preferably in the range of 38.0-55.0 wt % and most preferably within the range of 40.0-53.0 wt %.

The second elastomeric propylene copolymer fractions (EPC2) preferably has an intrinsic viscosity (iV) measured according to ISO 1628-1 (at 135° C. in decaline) of 3.2-4.5 dl/g, more preferably of 3.4-4.2 dl/g and most preferably of 3.5-4.0 dl/g.

The comonomer content of each of the first elastomeric propylene copolymer fractions (EPC1) and the second elastomeric propylene copolymer fractions (EPC2) can be measured for the first elastomeric propylene copolymer fractions (EPC1) and the mixture of first elastomeric propylene copolymer fractions (EPC1) and second elastomeric propylene copolymer fractions (EPC2). The second propylene copolymer fraction (EPC2) is then calculated. The calculation of the comonomer content is given below under "Examples". If the elastomeric propylene copolymer (EPC) is prepared separately from the polypropylene constituting the matrix, it can be subsequently blended with the matrix polymer by any conventional blending means, e.g. melt blending in an extruder.

Alternatively, the elastomeric propylene copolymer (EPC) can be prepared as a reactor blend together with the propylene homo- and/or copolymer (PP) constituting the matrix (M), e.g. starting with the production of the matrix polymer in a loop reactor and optionally a gas phase reactor, followed by transferring the product into one or more gas phase reactors, where the elastomeric propylene copolymer (EPC) is polymerized.

Ad Component (c)

As component (c) a crystalline ethylene copolymer with an α-olefin with 3-10 carbon atoms is optionally present.

α-olefins with 3-10 carbon atoms are for example propylene, 1-butene, 1-pentene, 1-hexene, 1-heptene and 1-octene.

The crystalline ethylene copolymer is a by-reaction product obtained by the preparation of the heterophasic polypropylene composition. Such crystalline ethylene copolymer is present as inclusion in the amorphous phase due to thermodynamic reasons.

The crystalline ethylene copolymer has a melting temperature $T_{m2}$ and a melting enthalpy $H_{m2}$ as determined by DSC analysis according to ISO 11357.

Preferably, $T_{m2}$ of the crystalline ethylene copolymer is within the range of 105° C. to 130° C., more preferably within the range of 110° C. to 127° C. and most preferably within the range of 112° C. to 124° C.

Preferably, $H_{m2}$ of the crystalline ethylene copolymer is less than 7 J/g, more preferably less than 6 J/g and most preferably less than 5 J/g.

Ad Component (d)

As component (d) polymeric nucleating agent (PNA) is present.

Preferably the polymeric nucleating agent is an alpha-nucleating agent, more preferably a polymeric alpha-nucleating agent, e.g. a vinylcycloalkane polymer and/or a vinylalkane polymer.

Said polymeric nucleating agent maybe introduced into the composition by blending with a masterbatch (MB) together with e.g. a carrier polymer or during polymerization of the heterophasic propylene copolymer (HECO), preferably, the polymeric nucleating agent is introduced into the composition by prepolymerizing the catalyst used to prepare a part or all of the heterophasic propylene copolymer (HECO).

Any known polymeric nucleating agent may be employed including polymers of vinyl alkanes and vinyl cycloalkanes.

A preferred example of such a polymeric nucleating agent is a vinyl polymer, such as a vinyl polymer derived from monomers of the formula

wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^1$ and $R^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

In case the nucleating agent is incorporated to the polypropylene composition in the form of a masterbatch (MB) said polymeric nucleating agent, which is preferably alpha-nucleating agent, most preferably a vinylcycloalkane, like vinylcyclohexane (VCH), polymer and/or vinylalkane polymer, preferably vinylcyclohexane (VCH), as defined above or below, is preferably present in an amount of not more than 500 ppm, more preferably of 1 to 200 ppm, and still more preferably of 5 to 100 ppm, based on the weight of the master batch (100 wt %). In this embodiment, more preferably, said masterbatch (MB) is present in an amount of not more than 10.0 wt %, more preferably not more than 5.0 wt % and most preferably not more than 3.5 wt %, with the preferred amount of masterbatch (MB) being from 1.5 to 3.5 wt %, based on the total amount of the heterophasic propylene copolymer (HECO). Most preferably the masterbatch (MB) comprises, preferably consists of a homopolymer or copolymer, preferably homopolymer, of propylene which has been nucleated according to BNT-technology as described below.

It is preferred that the nucleating agent is introduced to the polypropylene composition during the polymerization process of the heterophasic propylene copolymer (HECO). The nucleating agent is preferably introduced to the heterophasic propylene copolymer (HECO) by first polymerizing the above defined vinyl compound, preferably vinylcycloalkane, as defined above or below, in the presence of a catalyst system comprising a solid catalyst component, preferably a solid Ziegler Natta catalyst component, a cocatalyst and optional external donor, and the obtained reaction mixture of the polymer of the vinyl compound, preferably vinyl cyclohexane (VCH) polymer, and the catalyst system is then used for producing the heterophasic propylene copolymer (HECO). The above incorporation of the polymeric nucleating agent to the heterophasic propylene copolymer (HECO) during the polymerization of said heterophasic propylene copolymer (HECO) is called herein as BNT-technology as described below.

Said obtained reaction mixture is herein below referred interchangeably as modified catalyst system.

Preferably the polymeric nucleating agent is vinylcyclohexane (VCH) polymer which is introduced into the heterophasic propylene copolymer (HECO) by the BNT technology. More preferably in this preferred embodiment, the amount of polymeric nucleating agent, like vinylcyclohexane (VCH), polymer and/or vinylalkane polymer, more preferably of vinylcyclohexane (VCH) polymer, in the heterophasic propylene copolymer (HECO) is not more than 500 ppm, more preferably of 1 to 200 ppm, most preferably 5 to 100 ppm.

With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the Ziegler-Natta procatalyst, an external donor and a cocatalyst, which vinyl compound has the formula: $CH_2=CH-CHR^1R^2$ as defined above.

The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

When a nucleating agent is introduced to the heterophasic propylene copolymer (HECO) during the polymerization process, the amount of nucleating agent present in the heterophasic propylene copolymer (HECO) is preferably not more than 500 ppm, more preferably is 0.025 to 200 ppm, still more preferably is 1 to 100 ppm, and most preferably is 5 to 100 ppm, based on the heterophasic propylene copolymer (HECO) and the nucleating agent, preferably based on the total weight of the heterophasic propylene copolymer (HECO) including all additives.

The use of the polymeric nucleating agent in accordance with the present invention enables the preparation of heterophasic propylene copolymer (HECO) having highly satisfactory mechanical properties, i.e. for improved stiffness/impact balance, so that it is not required for the compositions in accordance with the present invention to contain low molecular weight nucleating agents, in particular costly particulate nucleating agents like organo-phosphates or soluble nucleants like sorbitol- or nonitol-derived nucleating agents.

Ad Heterophasic Composition

The heterophasic polypropylene copolymer (HECO) of the present inventions is further characterized by a total melt flow rate ($MFR_T$) (ISO 1133; 230° C.; 2.16 kg) in the range of 25.0 to 250.0 g/10 min, preferably in the range of 28.0 to 200 g/10 min, more preferably in the range of 32.0 to 150.0 g/10 min and even more preferably in the range of 34.0 to 100.0 g/10 min.

Preferably the final melt flow rate of the heterophasic propylene copolymer (HECO) is adjusted during the polymerization process. Accordingly the reactor-made heterophasic propylene copolymer (HECO) has the melt flow rate as defined above or in the claims. "Reactor-made heterophasic propylene copolymer (HECO)" denotes herein that the melt flow rate of the heterophasic propylene copolymer (HECO) has not been modified on purpose by post-treatment. Accordingly, in the preferred embodiment the heterophasic propylene copolymer (HECO) is non-visbroken, particularly not visbroken using peroxide. Accordingly, the melt flow rate is not increased by shortening the chain length of the heterophasic propylene copolymer (HECO) according to this invention by use of peroxide. Thus it is preferred that the heterophasic propylene copolymer (HECO) does not contain any peroxide and/or decomposition product thereof.

It is also appreciated that the total content of the comonomers, i.e. the sum of content of ethylene and α-olefins with 4 to 10 C-atoms, in the total heterophasic propylene copolymer (HECO) is rather moderate.

Accordingly it is preferred that the heterophasic propylene copolymer (HECO) has a total comonomer content, preferably ethylene content, in the range of 5.0 to 25.0 wt %, preferably in the range of 6.0 to 20.0 wt % and more preferably in the range of 7.0 to 15.0 wt %.

The Charpy notched impact strength of the heterophasic propylene copolymer (HECO) at 23° C. as measured according to ISO 179-1eA is in the range of 4.5 to 50.0 $kJ/m^2$, preferably in the range of 5.0 to 30.0 $kJ/m^2$ and more preferably in the range of 5.5 to 20.0 $kJ/m^2$.

The Charpy notched impact strength of the heterophasic polypropylene composition at −20° C. as measured according to ISO 179-1eA is preferably in the range of 1.5 to 10.0 $kJ/m^2$, preferably in the range of 2.0 to 9.0 $kJ/m^2$ and more preferably in the range of 2.2 to 8.0 $kJ/m^2$.

In addition the inventive heterophasic propylene copolymer (HECO) preferably follows the inequation:

$$NIS(23° C.) > 13 - 2.01 \ln(MFR_T)$$

wherein NIS(23° C.) is the Charpy notched impact strength of the heterophasic polypropylene composition at 23° C. as measured according to ISO 179-1eA and $\ln(MFR_T)$ is the natural logarithm of the total melt flow rate (ISO 1133; 230° C.; 2.16 kg).

Further, a specimen consisting of the heterophasic propylene copolymer (HECO) preferably has a puncture energy at +23° C. of at least 10.0 J, more preferably of at least 12.0 J, still more preferably of at least 15.0 J determined according to ISO 6603-2, and at −20° C. of at least 10.0 J, preferably at least 12.0 J and more preferably of at least 15.0 J determined according to ISO 6603-2.

Furthermore, a specimen consisting of the heterophasic propylene copolymer (HECO) preferably has a puncture energy at +23° C. of not more than 80.0 J, more preferably of not more than 50.0 J, still more preferably of not more than 40.0 J, most preferably of not more than 35.0 J determined according to ISO 6603-2, and at −20° C. of not more than 35.0 J, more preferably not more than 30.0 J, even more preferably of not more than 25.0 J, and most preferably not more than 20.0 J, determined according to ISO 6603-2.

The heterophasic propylene copolymer (HECO) according to the invention has a tensile modulus of more than 1000 MPa, preferably more than 1100 MPa, still even more preferably more than 1200 MPa determined according to ISO 527-2 on injection ISO multipurpose moulded specimens prepared in accordance with EN ISO 1873-2.

The tensile modulus of the heterophasic polypropylene resin according to the invention will usually not be higher than 2000 MPa, preferably not higher than 1800 MPa.

The heterophasic propylene copolymer (HECO) of the present invention is composed of components (a) and (b) and (d) and optional component (c).

Component (a) is present in an amount of from 70 to 90 wt %, preferably from 73 to 87 wt % and more preferably from 74 to 86 wt %

Component (b) is present in an amount of from 30 to 10 wt %, preferably from 27 to 13 wt % and more preferably from 26 to 14 wt %.

Component (c) is present in an amount of from 0 to 5.0 wt %, preferably from 0.1 to 4.0 wt % and more preferably from 0.2 to 3.0 wt %.

Component (d) is present in an amount of from 0.0001 to 0.1 wt %, preferably from 0.005 to 0.05 wt % and more preferably from 0.001 to 0.01 wt %.

If component (d) is added in the form of a masterbatch (MB), the amount of masterbatch containing component (d) is up to 10 wt % related to the entire heterophasic propylene copolymer (HECO), preferably up to 5 wt % and more preferably in the range of 1.5 to 3.5 wt % based on the entire heterophasic propylene copolymer (HECO).

The sum of fractions (a), (b), (c) and (d) is 100 wt % or lower depending on the presence of further fractions or additives. The ranges in percent by weight (wt %) as used herein define the amount of each of the fractions or components based on the entire heterophasic propylene copolymer (HECO) according to the present invention. All fractions and components together give a sum of 100 wt %.

The heterophasic propylene copolymer (HECO) according to the present invention apart from the polymeric components and the polymeric nucleating agent (d), optionally in the form of a masterbatch (MB), may comprise further non-polymeric components, e.g. additives for different purposes.

The following are optional additives: process and heat stabilisers, pigments and other colouring agents allowing retaining transparency, antioxidants, antistatic agents, slip agents, antiblocking agent, UV stabilisers and acid scavengers.

Depending on the type of additive, these may be added in an amount of 0.001 to 2.0 wt %, based on the weight of the heterophasic propylene copolymer (HECO).

Preparation of the Heterophasic Propylene Copolymer (HECO)

The heterophasic propylene copolymer (HECO) in accordance with the present invention may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes.

The heterophasic propylene copolymer (HECO) according to the invention is preferably prepared by a sequential polymerization process, as described below, in the presence of a catalyst system comprising a Ziegler-Natta Catalyst (ZN-C), a cocatalyst (Co) and optionally an external donor (ED), as described below.

The term "sequential polymerization system" according to this invention indicates that the nucleated heterophasic propylene copolymer (HECO) is produced in at least three reactors connected in series. Accordingly, the present polymerization system comprises at least a pre-polymerization reactor (PR), a first polymerization reactor (R1) and a second polymerization reactor (R2), a third polymerization reactor (R3) and optionally a fourth polymerization reactor (R4). The term "polymerization reactor" shall indicate that the main polymerization takes place.

Preferably, at least one of the two polymerization reactors (R1) and (R2) is a gas phase reactor (GPR). More preferably the second polymerization reactor (R2), the third polymerization reactor (R3) and the optional fourth polymerization reactor (R4) are gas phase reactors (GPRs), i.e. a first gas phase reactor (GPR1) and a second gas phase reactor (GPR2) and a third gas phase reactor (GPR3). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

In this first polymerization reactor (R1) the first polypropylene fraction (PP1), preferably the first propylene homopolymer fraction (H-PP1), of the matrix polypropylene (PP) is produced.

Preferably this propylene homopolymer of the first polymerization reactor (R1), i.e. the first propylene homopolymer fraction (H-PP1), more preferably the polymer slurry of the loop reactor (LR) containing the first propylene homopolymer fraction (H-PP1), is directly fed into the second polymerization reactor (R2), i.e. into the (first) gas phase reactor (GPR1), without a flash step between the stages.

This kind of direct feed is described in EP 887379 A, EP 887380 A, EP 887381 A and EP 991684 A.

By "direct feed" is meant a process wherein the content of the first polymerization reactor (R1), i.e. of the loop reactor (LR), the polymer slurry comprising the first propylene homopolymer fraction (H-PP1), is led directly to the next stage gas phase reactor.

Alternatively, the propylene homopolymer of the first polymerization reactor (R1), i.e. the first propylene homopolymer fraction (H-PP1), more preferably polymer slurry of the loop reactor (LR) containing the first propylene homopolymer fraction (H-PP1), may be also directed into a flash step or through a further concentration step before fed into the second polymerization reactor (R2), i.e. into the $1^{st}$ gas phase reactor (GPR1). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2) and the third polymerization reactor (R3) and any subsequent reactor, for instance, the fourth polymerization reactor (R4) are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and the third polymerization reactor (R3), and the optional fourth polymerization reactor (R4) are gas phase reactors (GPRs).

Accordingly for the instant process at least three, preferably three polymerization reactors (R1), (R2) and (R3) or four polymerization reactors (R1), (R2), (R3) and (R4), namely a slurry reactor (SR), like loop reactor (LR) and a (first) gas phase reactor (GPR1), a second gas phase reactor (GPR2), and optionally a third gas phase reactor (GPR3) connected in series are used.

Prior to the slurry reactor (SR) a pre-polymerization reactor is placed.

As the process covers also a pre-polymerization step, all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and in the third reactor (R3) and the optional the fourth reactor (R4) is in the range of 75 to 95° C., more preferably in the range of 78 to 92° C.

Preferably the operating temperature in the second polymerization reactor (R2) is equal to or higher than the operating temperature in the first polymerization reactor (R1). Accordingly it is preferred that the operating temperature
(a) in the first polymerization reactor (R1) is in the range of 62 to 85° C., more preferably in the range of 65 to 82° C., still more preferably in the range of 67 to 80° C., like 70 to 80° C.; and
(b) in the second polymerization reactor (R2) is in the range of 75 to 95° C., more preferably in the range of 78 to 92° C., still more preferably in the range of 78 to 88° C.,
with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and in any subsequent reactor, like in the third polymerization reactor (R3), e.g. in the second gas phase reactor (GPR2), or in a fourth polymerization reactor (R4), e.g. in the third gas phase reactor (GPR3) is in the range from 5 to 50 bar, preferably 10 to 40 bar. Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume (VR) to the volumetric outflow rate from the reactor (Qo) (i.e. VR/Qo), i.e $\tau = VR/Qo$ [tau=VR/Qo]. In case of a loop reactor the reaction volume (VR) equals to the reactor volume.

Accordingly the average residence time ($\tau$) in the first polymerization reactor (R1) is preferably at least 5 min, more preferably in the range of 15 to 80 min, still more preferably in the range of 20 to 60 min, like in the range of 24 to 50 min, and/or the average residence time ($\tau$) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time ($\tau$) in the third polymerization reactor (R3) or in the fourth polymerization reactor (R4)—if present—is preferably at least 30 min, more preferably in the range of 30 to 120 min, still more preferably in the range of 40 to 100 min, like in the range of 50 to 90 min.

As mentioned above the preparation of the heterophasic propylene copolymer (HECO) comprises in addition to the (main) polymerization of the propylene polymer in the at least three polymerization reactors (R1, R2, R3 and optional R4) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR).

The pre-polymerization reaction is typically conducted at a temperature of 10 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge. Accordingly, the propylene polymer is preferably produced in a process comprising the following steps under the conditions set out above:
a) In the pre-polymerization, a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). Subsequent to the pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final heterophasic propylene copolymer (HECO) is rather low and typically not more than 5.0 wt %, more preferably not more than 4.0 wt %, still more preferably in the range of 0.5 to 4.0 wt %, like in the range 1.0 of to 3.0 wt %.
b) In the first polymerization reactor (R1), i.e. in a loop reactor (LR), propylene is polymerized obtaining a first propylene homopolymer fraction (H-PP1) of the propylene homopolymer (H-PP), transferring said first propylene homopolymer fraction (H-PP1) to a second polymerization reactor (R2), c) in the second polymerization reactor (R2) propylene is polymerized in the presence of the first propylene homopolymer fraction (H-PP1) obtaining a second propylene homopolymer fraction (H-PP2) of the propylene homopolymer.

Said fraction [H-PP1+H-PP2] is further transferred to a third polymerization reactor R3 obtaining a either a third propylene homopolymer fraction (H-PP3) or a first propylene copolymer fractions (EPC1) in the presence of all fractions produced in earlier steps.

Optionally it is possible to transfer the entire polymer produced to a fourth polymerization reactor R4, i.e. either [H-PP1+H-PP2+H-PP3] or [H-PP1+H-PP2+EPC1], obtaining either a first propylene copolymer fractions (EPC1) or a second propylene copolymer fraction (EPC2) in the presence of all fractions produced in earlier steps.

So the nucleated polymer produced may comprise the following fractions:

the polypropylene (Pre-PP) produced in the pre-polymerization reactor (PR)+a first propylene homopolymer fraction (H-PP1)+a second propylene homopolymer fraction (H-PP2)+a propylene copolymer fractions (EPC1) or the polypropylene (Pre-PP) produced in the pre-polymerization reactor (PR)+a first propylene homopolymer fraction (H-PP1)+a second propylene homopolymer fraction (H-PP2)+a third propylene homopolymer fraction (H-PP3)+a propylene copolymer fractions (EPC1) or the polypropylene (Pre-PP) produced in the pre-polymerization reactor (PR)+a first propylene homopolymer fraction (H-PP1)+a second propylene homopolymer fraction (H-PP2)+a first propylene copolymer fractions (EPC1)+a second propylene copolymer fractions (EPC2).

By using—as stated above—a loop reactor and at one or two gas phase reactor in serial configuration and working at different conditions, a multimodal (e.g. bimodal or trimodal) propylene homopolymer matrix (M) can be obtained.

If the loop reactor and the first gas phase reactor are run under conditions yielding similar polymers, an unimodal matrix can be obtained.

A preferred multistage process is a "loop-gas phase"-process, as developed by *Borealis* (known as BORSTAR® technology) and is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic polypropylene composition is obtained by a multistage polymerization process, as described above, in the presence of a catalyst system.

In the process described above a Ziegler-Natta catalyst (ZN-C) for the preparation of the heterophasic polypropylene composition is applied. This Ziegler-Natta catalyst (ZN-C) can be any stereo-specific Ziegler-Natta catalyst (ZN-C) for propylene polymerization, which preferably is capable of catalysing the polymerization and copolymerization of propylene and comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C) comprises a high-yield Ziegler-Natta type catalyst including an internal donor component, which can be used at high polymerization temperatures of 80° C. or more.

Such high-yield Ziegler-Natta catalyst (ZN-C) can comprise a succinate, a diether, a phthalate etc., or mixtures therefrom as internal donor (ID) and are for Example commercially available for example from LyondellBasell under the Avant ZN trade name.

Examples of the Avant ZN series are Avant ZN 126 and Avant ZN 168. Avant ZN 126 is a Ziegler-Natta catalyst with 3.5 wt % titanium and a diether compound as internal electron donor, which is commercially available from LyondellBasell. Avant ZN 168 is a Ziegler-Natta catalyst with 2.6 wt % titanium and a succinate compound as internal electron donor, which is commercially available from LyondellBaselll.

A further Example of the Avant ZN series is the catalyst ZN180M of Basell.

The Ziegler-Natta catalyst (ZN-C) is preferably used in association with an alkyl aluminum cocatalyst (Co) and optionally external donors (ED).

As further component in the instant polymerization process an external donor (ED) is preferably present. Suitable external donors include certain silanes, ethers, esters, amines, ketones, heterocyclic compounds and blends of these. It is especially preferred to use a silane. It is most preferred to use silanes of the general formula

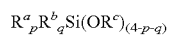

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

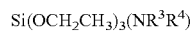

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the dicyclopentyl dimethoxy silane donor (D-donor) or the cyclohexylmethyl dimethoxy silane donor (C-Donor).

In addition to the Ziegler-Natta catalyst (ZN-C) and the optional external donor (ED), a co-catalyst (Co) can be used. The co-catalyst (Co) is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

The heterophasic polypropylene composition (HECO) according to this invention is preferably produced in the presence of
(a) a Ziegler-Natta catalyst (ZN-C) comprising an internal donor (ID),
(b) optionally a co-catalyst (Co), and
(c) optionally an external donor (ED).

As mentioned above the Ziegler-Natta catalyst (ZN-C) is preferably modified by the so called BNT-technology during the above described pre-polymerization step in order to introduce the polymeric nucleating agent.

Such a polymeric nucleating agent is as described above a vinyl polymer, such as a vinyl polymer derived from monomers of the formula

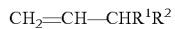

as described above.

The weight ratio of vinyl compound to polymerization catalyst in the modification step of the polymerization catalyst preferably is 0.3 or more up to 40, such as 0.4 to 20 or more preferably 0.5 to 15, like 0.5 to 2.0.

The polymerization of the vinyl compound, e.g. VCH, can be done in any inert fluid that does not dissolve the polymer formed (e.g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e.g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the pre-polymerized catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 60° C., preferably 15 to 55° C.

According to the invention, nucleated high-stiffness propylene polymers are obtained when the modification of the catalyst is carried out in the presence of strongly coordinating external donors.

General conditions for the modification of the catalyst are also disclosed in WO 00/6831, incorporated herein by reference with respect to the modification of the polymerization catalyst.

The preferred embodiments as described previously in the present application with respect to the vinyl compound also apply with respect to the polymerization catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification.

Therefore a process for the production of a heterophasic propylene copolymer (HECO) of the present invention is also an object of the present invention. Such a process comprises polymerizing propylene in at least 3 subsequent polymerization steps in the presence of
a) a Ziegler-Natta catalyst comprising compounds (TC) of a transition metal of Group 4 to 6 of IUPAC, a Group 2 metal compound and an internal donor,
b) a co-catalyst (Co), and
c) optionally an external donor (ED)

and introducing the polymeric nucleating agent either in a prepolymerization step or in the form of a masterbatch (MB) together with a carrier polymer.

Use of Heterophasic Heterophasic Propylene Copolymer (HECO)

The polypropylene composition according to the invention can be used in various application fields, due to its improved stiffness/impact balance.

Thus, according to a further embodiment of the invention the heterophasic propylene copolymer (HECO) of the invention is used for the production of films, extruded, blow moulded or injection moulded articles, such as pouches and bags, pipes and fittings, transport packaging containers as well as components for car exteriors and interiors, like dashboards, door claddings, consoles, bumpers and trims.

Further, the present invention is also directed to an article made of the inventive heterophasic propylene copolymer (HECO), particularly a film, an extruded, blow moulded or injection moulded article.

The present invention is further concerned with a moulded article comprising the processed heterophasic propylene copolymer (HECO) as described herein. The main end-uses for such moulded articles are in packaging applications like thin wall packaging for frozen or fresh food, adhesives, cosmetics or pharmaceuticals. Other end-uses are plastic containers and household articles, but also medical products, rigid packaging like detergent cartons, cup and plate boards for oven or microwave use or sterilizable food packaging, especially for deep freeze or refrigerator uses. The present invention provides the specific advantage that such articles may be produced with lower wall thicknesses without expense in the flowability of the polypropylene compositions and still having excellent impact properties. Furthermore the stiffness/impact balance of the articles produced with the heterophasic propylene copolymer (HECO) of the present invention is excellent.

The article is produced by any common conversion process suitable for thermoplastic polymers like injection moulding, extrusion blow moulding, injection stretch blow moulding or cast film extrusion.

EXPERIMENTAL PART

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs. For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2.1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2.1 erythro regio-defects was quantified using the average integral of the two characteristic methyl sites at 17.7 and 17.2 ppm:

$P_{21e}=(I_{e6}+I_{e8})/2$

The amount of 1.2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2.1 erythro regio-defects was quantified with respect to all propene:

$[21e]$mol.-%=100*$(P_{21e}/P_{total})$

Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2.1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The Xylene Soluble Fraction at Room Temperature (XCS, Wt %):

The amount of the polymer soluble in xylene is determined at 25° C. according to ISO 16152; 5th edition; 2005-07-01.

Intrinsic Viscosity (iV)

The intrinsic viscosity (V) value increases with the molecular weight of a polymer. The iV values e.g. of the XCS were measured according to ISO 1628/1 in decalin at 135° C.

DSC Analysis, Melting Temperature ($T_m$), Melting Enthalpy ($H_m$), Crystallization Temperature ($T_c$) and Crystallization Enthalpy ($H_c$):

measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and crystallization enthalpy ($H_c$) are determined from the cooling step, while melting temperature ($T_m$) and melting enthalpy ($H_m$) are determined from the second heating step respectively from the first heating step in case of the webs.

The glass transition temperature Tg is determined by dynamic mechanical thermal analysis according to ISO 6721-7. The measurements are done in torsion mode on compression moulded samples (40×10×1 mm$_3$) between −100° C. and +150° C. with a heating rate of 2° C./min and a frequency of 1 Hz.

MFR$_2$ (230° C.) is measured according to ISO 1133 (230° C., 2.16 kg load)

The melt flow rate is measured as the MFR$_2$ in accordance with ISO 1133 15 (230° C., 2.16 kg load) for polypropylene and in accordance with ISO 1133 (190° C., 2.16 kg load) for polyethylene and is indicated in g/10 min. The MFR$_2$ of a fraction (B) produced in the presence of a fraction (A) is calculated using the measured values of MFR$_2$ of fraction (A) and the mixture received after producing fraction (B) ("final"):

$$\text{Log(MFR}_{final})=\text{weight fraction}(A)*\text{Log(MFR}_A)+\text{weight fraction}(B)*\text{Log(MFR}_B)$$

Charpy Notched Impact Strength

Charpy notched impact is measured according to ISO 179/1eA at +23° C. and at −20° C. using an injection moulded test specimen (80×10×4 mm) as produced according to ISO 1873.

Tensile Properties

Tensile properties were determined according to ISO 527-2 on injection ISO multipurpose moulded specimens prepared in accordance with EN ISO 1873-2.

Tensile modulus (in MPa) was determined according to ISO 527-2. The measurement was conducted at 23° C. with an elongation rate of 1 mm/min.

Melting Temperature

Melting temperature ($T_m$) was measured with a Mettler TA820 differential scanning calorimetry (DSC) apparatus on 5 to 10 mg samples. DSC was performed according to ISO 3146 (part 3, method C2) in a heat/cool/heat 15 cycle with a scan rate of 10° C./min in the temperature range of +23 to +210° C. Melting temperature was determined from the second heating step.

Puncture energy (IPT) is determined in the instrumented falling weight test according to ISO 6603-2 using injection moulded plaques of 60×60×2 mm and a test speed of 2.2 m/s, clamped, lubricated striker with 20 mm diameter. The reported puncture energy results from an integral of the failure energy curve measured at (60×60×2 mm).

Calculations:

Calculation of the Xylene Cold Soluble (XCS) Content of the Second Polypropylene Fraction (PP2):

$$\frac{XS(R2) - w(PP1) \times XS(PP1)}{w(PP2)} = XS(PP2)$$

wherein w(PP1) is the weight fraction of the first polypropylene fraction (PP1), i.e. the product of the first reactor (R1), w(PP2) is the weight fraction of the second polypropylene fraction (PP2), i.e. of the polymer produced in the second reactor (R2), XS(PP1) is the xylene cold soluble (XCS) content [in wt %] as determined at 25° C. according to ISO 16152; 5$^{th}$ edition; 2005-07-01 of the first polypropylene fraction (PP1), i.e. of the product of the first reactor (R1), XS(R2) is the xylene cold soluble (XCS) content [in wt %] as determined at 25° C. according to ISO 16152; 5$^{th}$ edition; 2005-07-01 of the product obtained in the second reactor (R2), i.e. the mixture of the first polypropylene fraction (PP1) and the second polypropylene fraction (PP2), XS(PP2) is the calculated xylene cold soluble (XCS) content [in wt.-%] of the second polypropylene fraction (PP2).

Calculation of xylene cold soluble (XCS) content of the third polypropylene fraction (PP3) if present:

$$\frac{XS(R3) - w(R2) \times XS(R2)}{w(PP3)} = XS(PP3)$$

wherein w(R2) is the weight fraction of the second reactor (R2), i.e. the mixture of the first polypropylene fraction (PP1) and the second polypropylene fraction (PP2), w(PP3) is the weight fraction of the third polypropylene fraction (PP3), i.e. of the polymer produced in the third reactor (R3), XS(R2) is the xylene cold soluble (XCS) content [in wt %] as determined at 25° C. according to ISO 16152; 5$^{th}$ edition; 2005-07-01 of the product of the second reactor (R2), i.e. the mixture of the first polypropylene fraction (PP1) and second polypropylene fraction (PP2), XS(R3) is the xylene cold soluble (XCS) content [in wt %] as determined at 25° C. according to ISO 16152; 5$^{th}$ edition; 2005-07-01 of the product obtained in the third reactor (R3), i.e. the mixture of the first polypropylene fraction (PP1), the second polypropylene fraction (PP2), and the third polypropylene fraction (PP3), XS(PP3) is the calculated xylene cold soluble (XCS) content [in wt.-%] of the third polypropylene fraction (PP3).

For the calculation of not directly determined intrinsic viscosities and comonomer contents of fractions the same linear mixing rule as for the xylene solubles content (XS) is used. The respective assumptions for a composition comprising N fractions are:

$$iV_{total} = \sum_{n=1}^{N} w_n iV_n$$

and $$C2_{total} = \sum_{n=1}^{N} w_n C2_n$$

Calculation of melt flow rate MFR$_2$(230° C.) of the second polypropylene fraction (PP2):

$$MFR(PP2) = 10^{\left[\frac{log(MFR(R2)) - w(PP1) \times log(MFR(PP1))}{w(PP2)}\right]}$$

wherein w(PP1) is the weight fraction of the first polypropylene fraction (PP1), i.e. the product of the first reactor (R1), w(PP2) is the weight fraction of the second polypropylene fraction (PP2), i.e. of the polymer produced in the second reactor (R2), MFR(PP1) is the melt flow rate MFR2 (230° C.) [in g/10 min] measured according ISO 1133 of the first polypropylene fraction (PP1), i.e. of the product of the first reactor (R1), MFR(R2) is the melt flow rate MFR2 (230° C.) [in g/10 min] measured according ISO 1133 of the product obtained in the second reactor (R2), i.e. the mixture of the first polypropylene fraction (PP1) and the second polypropylene fraction (PP2), MFR(PP2) is the calculated melt flow rate MFR2 (230° C.) [in g/10 min] of the second polypropylene fraction (PP2).

Calculation of melt flow rate MFR$_2$ (230° C.) of the third polypropylene fraction (PP3) if present:

$$MFR(PP3) = 10^{\left[\frac{log(MFR(R3)) - w(R2) \times log(MFR(R2))}{w(PP3)}\right]}$$

wherein w(R2) is the weight fraction of the second reactor (R2), i.e. the mixture of the first polypropylene fraction (PP1) and the second polypropylene fraction (PP2), w(PP3) is the weight fraction of the third polypropylene fraction (PP3), i.e. of the polymer produced in the third reactor (R3), MFR(R2) is the melt flow rate MFR2 (230° C.) [in g/10 min] measured according ISO 1133 of the product of the second reactor (R2), i.e. of the mixture of the first polypropylene fraction (PP1) and second polypropylene fraction (PP2), 5

MFR(R3) is the melt flow rate MFR2 (230° C.) [in g/10 min] measured according ISO 1133 of the product obtained in the third reactor (R3), i.e. the mixture of the first polypropylene fraction (PP1), the second polypropylene fraction (PP2), and the third polypropylene fraction (PP3), MFR(PP3) is the calculated melt flow rate MFR2 (230° C.) [in g/10 min] of the third 10 polypropylene fraction (PP3).

B. Examples

The catalyst used in the polymerization process for the heterophasic propylene copolymer (HECO) of the inventive examples (IE 1 to 2) was the commercial Avant ZN180M of LyondellBasell with triethyl-aluminium (TEA) as co-catalyst and dicyclo pentyl dimethoxy silane (donor D) as donor. Polymerization data is shown in Table 1.

In Example 1 a trimodal propylene homopolymer matrix was produced in the loop reactor and in the subsequent gas phase reactors (GPR1+GPR2). In the 3$^{rd}$ gas phase reactor (GPR3) a unimodal elastomeric propylene copolymer (EPC=EPC1) was prepared in the presence of the matrix polymer.

Matrix split: 50 wt % loop+37 wt % GPR1+13 wt % GPR2
elastomeric propylene copolymer (EPC): 100 wt % in GPR3
full split: 41/31/10/18

In Example 2 a unimodal propylene homopolymer matrix was produced in the loop reactor and in the subsequent gas phase reactor (GPR1). In the 2nd gas phase reactor (GPR2) a unimodal elastomeric propylene copolymer (EPC=EPC1) was prepared in the presence of the matrix polymer.
Matrix split: 59 wt % loop and 41 wt % GPR1
elastomeric propylene copolymer (EPC) split: 100 wt % in GPR2

The polymeric nucleating agent was incorporated via so called Masterbatch-Technology: 2 wt % of a polypropylene-homopolymer comprising polymeric nucleating agent was compounded into the polymers of IE1 and IE2, as indicated in Table 2 below.

The polypropylene homopolymer used for nucleation via Masterbatch Technology was produced as follows:

a) Catalyst Preparation 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 1.0 ml of a toluene solution with 2 mg Necadd 447 was added. Then 24.0 ml of heptane was added to form an emulsion. Mixing was continued for 30 minutes at 25° C. Then the reactor temperature was raised to 90° C. within 30 minutes. The reaction mixture was stirred for further 30 minutes at 90° C. Afterwards stirring was stopped and the reaction mixture was allowed to settle for 15 minutes at 90° C.

The solid material was washed 5 times: Washings were made at 80° C. under stirring 30 min with 170 rpm. After stirring was stopped the reaction mixture was allowed to settle for 20-30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml toluene.

Wash 4: Washing was made with 60 ml of heptane.

Wash 5. Washing was made with 60 ml of heptane under 10 minutes stirring.

Afterwards stirring was stopped and the reaction mixture was allowed to settle for 10 minutes decreasing the temperature to 70° C. with subsequent siphoning, and followed by N$_2$ sparging for 20 minutes to yield an air sensitive powder.

b) VCH Modification of the Catalyst 35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared in 1a (Ti content 1.4 wt %) was added and after additionally 20 minutes 5.0 g of vinylcyclohexane (VCH) was added). The temperature was increased to 60° C. during 30 minutes and was kept there for 20 hours. Finally, the temperature was decreased to 20° C. and the concentration of unreacted VCH in the oil/catalyst mixture was analysed and was found to be 120 ppm weight.

c) Polymerization 41 mg of donor D (TEAL/Donor ratio 10 mol/mol) and 206 mg of TEAL(TEAL/Ti ratio 250 mol/mol) was mixed with 30 ml of pentane. Donor to titanium was 25 mol/mol. Half of this mixture was added to the 5 litre stirred reactor and half was added to 209 mg of the oil/catalyst mixture (=124.7 mg of dry catalyst). After 10 minutes the pentane/catalyst/TEAL/donorD mixture was added to the reactor, followed by 300 mmol H2 and 1.4 kg of propylene at room temperature. The temperature was increased to 80° C. during 16 minutes and was kept at this temperature for 1 hour. Unreacted propylene was flashed out by opening the exhaust valve. The reactor was opened and the polymer powder was collected and weighed.

For the Comparative Examples CE1 to CE2 the Following Catalyst was Prepared:

Catalyst Preparation

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried.

Catalyst and its preparation concept is described in general e.g. in patent publications EP 491566, EP 591224 and EP 586390.

VCH Modification of the Catalyst

This example was done in accordance with Example 1 b, but as catalyst was used a phthalate containing catalyst prepared according to example C2a). (Ti content 1.8 wt %) 52 ml of oil, 1.17 g TEAL, 0.73 g donor D were used. The reaction temperature was 65° C. with this catalyst. The concentration of unreacted VCH in the final catalyst was 200 ppm weight. The concentration of unreacted VCH is almost twice as high with this phthalate containing catalyst, despite the higher reaction temperature, as with the phthalate free catalyst described as for Inventive Examples.

As external donor di(cyclopentyl) dimethoxy silane (donor D) was used.

The same polymer design as for the Inventive Examples was chosen for CE1 and CE2

Polymerization data can be seen in Table 1

TABLE 1

|  | IE1 | CE 1 | IE2 | CE 2 |
|---|---|---|---|---|
| TEAL/Ti [mol/mol] | 200 | 200 | 200 | 200 |
| TEAL/Donor [mol/mol] | 5 | 15 | 5 | 15 |
| Prepolymerization |  |  |  |  |
| Temperature [° C.] | 28 | 30 | 28 | 30 |
| Residence time [h] | 0.2 | 0.3 | 0.2 | 0.3 |
| Loop R1 |  |  |  |  |
| R1 Temperature [° C.] | 75 | 75 | 70 | 75 |
| R1 pressure [bar] | 45 | 55 | 45 | 55 |
| R1 Residence time [h] | 0.4 | 0.3 | 0.4 | 0.4 |
| R1 H2/C3 ratio [mol/kmol] | 9.2 | 30 | 7.1 | 25 |
| R1 C2/C3 ratio [mol/kmol] | 0 | 0 | 0 | 0 |
| R1 Split [%] | 41 | 38 | 48 | 50 |
| R1 MFR2 [g/10 min] | 223 | 205 | 163 | 155 |
| R1 XCS [wt %] | 4.2 | 2.0 | 4.4 | 2.0 |
| GPR1 R2 |  |  |  |  |
| R2 Temperature [° C.] | 80 | 80 | 80 | 80 |
| R2 pressure [bar] | 18 | 32 | 15 | 33 |
| R2 Residence time [h] | 0.9 | 1.8 | 1.6 | 1.7 |
| R2 C2/C3 ratio [mol/kmol] | 0 | 0 | 0 | 0 |
| R2 H2/C3 ratio [mol/kmol] | 45.3 | 180 | 85.5 | 205 |
| R2 split [%] | 31 | 34 | 33 | 32 |
| R2 MFR2 [g/10 min] total | 136 | 160 | 161 ($MFR_M$) | 161 ($MFR_M$) |
| Calculated MFR2 for GPR1 product | 70 | 95 | 160 | 161 |
| R2 XCS [wt. %] | 3.2 | 2.1 | 3.9 | 2.0 |
| R2 C2 content [wt. %] | 0 | 0 | 0 | 0 |
| GPR2 R3 |  |  |  |  |
| R3 Temperature [° C.] | 80 | 85 | 75 | 80 |
| R3 Pressure [bar] | 16 | 31 | 14 | 32 |
| R3 Residence time [h] | 1.6 | 2.3 | 0.4 | 1.2 |
| R3 C2/C3 ratio [mol/kmol] | 0 | 2 | 335 | 505 |
| R3 H2/C2 ratio [mol/kmol]* | 0.3* | 30* | 183 | 210 |
| R3 split [%] | 10 | 12 | 19 | 18 |
| R3 MFR2 [g/10 min] | 95 ($MFR_M$) | 65 ($MFR_M$) | 63 | 67 |
| Calculated MFR2 for GPR2product | 15 | 6 | 1.2 | 1.3 |
| R3 XCS [wt. %] | 3.0 | 3.2 | 22.7 | 18 |
| R3 C2 [wt %] | 0 | 0.1 | 9.9 | 7.6 |
| R3 C2(XCS) [wt %] | 0 | 3.5 | 44 | 42 |
| R3 iV(XCS) [dl/g] | n.d. | n.d. | 2.35 | 2.6 |
| GPR3 R4 |  |  |  |  |
| R4 Temperature [° C.] | 80 | 80 | — | — |
| R4 Pressure [bar] | 14 | 22 | — | — |
| R4 Residence time [h] | 1.0 | 0.9 | — | — |
| R4 C2/C3 ratio [mol/kmol] | 351 | 490 | — | — |
| R4 H2/C2 ratio [mol/kmol] | 66 | 200 | — | — |
| R4 split [%] | 18 | 16 | — | — |
| Final product |  |  |  |  |
| $MFR_2$ [g/10 min] | 39 | 37 | 63 | 67 |
| C2 content [wt %] total | 8.0 | 6.5 | 9.7 | 7.6 |
| XCS [wt %] | 20 | 16 | 22 | 18 |
| C2 of XCS [wt %] | 40 | 40 | 44 | 42 |
| Intrinsic viscosity of XCS [dl/g] | 3.2 | 2.6 | 2.4 | 2.6 |

*H2/C3 ratio for IE1 and CE1

The properties of the products obtained from the individual reactors naturally are not measured on homogenized material but on reactor samples (spot samples). The properties of the final resin are measured on homogenized material, the MFR$_2$ on pellets made thereof in an extrusion mixing process as described below.

To the polymers of IE1 and IE2 2 wt % of the above described masterbatch were admixed.

In addition all resins were mixed in a twin-screw extruder with 0.1 wt % of Pentaerythrityl-tetrakis(3-(3',5'-di-tert. butyl-4-hydroxyphenyl)-propionate, (CAS-no. 6683-19-8, trade name Irganox 1010) supplied by BASF AG, 0.1 wt % Tris (2,4-di-t-butylphenyl) phosphate (CAS-no. 31570-04-4, trade name Irgafos 168) supplied by BASF AG, and 0.05 wt % Calcium stearate (CAS-no. 1592-23-0) supplied by Croda Polymer Additive In Table 3 the mechanical polymer parameters are listed:

| Parameter | unit | CE1 | IE1 | CE2 | IE2 |
|---|---|---|---|---|---|
| Tensile Modulus | MPa | 1597 | 1577 | 1574 | 1304 |
| NIS 1eA +23° C. | kJ/m$^2$ | 5.3 | 8.3 | 3.6 | 5.7 |
| NIS 1eA −20° C. | kJ/m$^2$ | 2.6 | 3.7 | 1.97 | 3.0 |
| IPT +23° C. | J | 25.8 | 23.8 | 18.9 | 20.9 |
| IPT −20° C. | J | 9.7 | 17.5 | 9.9 | 18.3 |
| NIS(23° C.) > 13-2.01ln (MFR$_T$) | | no | yes | no | yes |

From Table 3 and from FIG. 1 it can be clearly seen that the inventive heterophasic propylene copolymer (HECO) have an improved stiffness/impact balance over the comparative examples.

Figure 2:
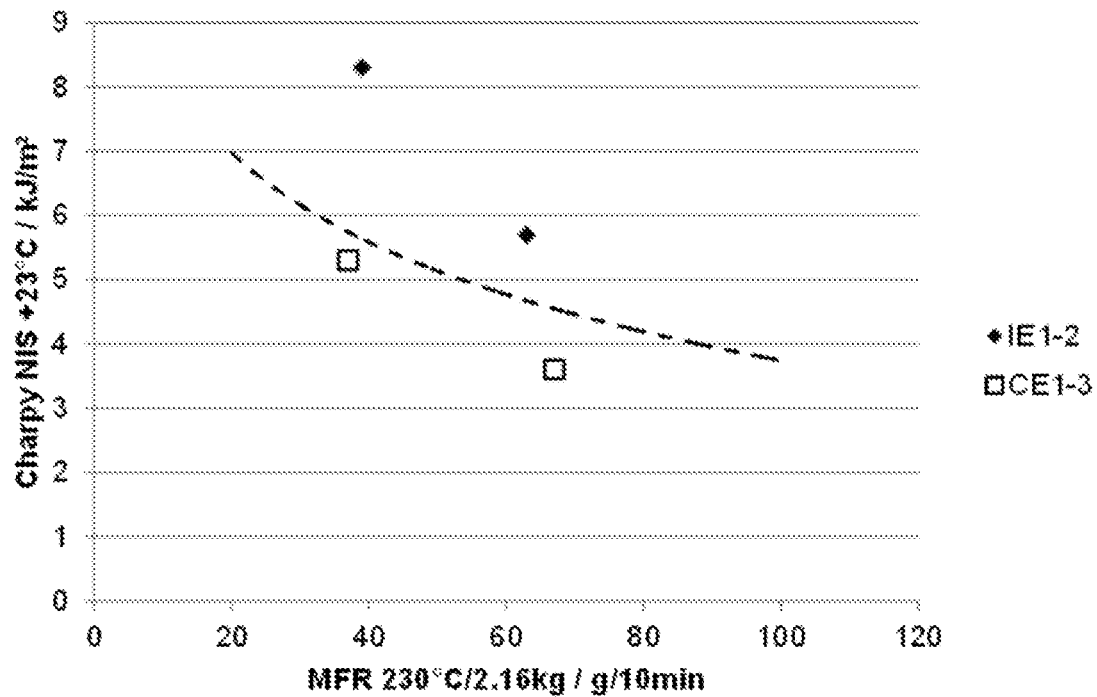
FIG. 2 illustrates inequation: NIS(23° C.) >13-2.01 ln(MFR$_T$).

FIG. 2 shows that the requirement of the relation between NIS and MFR (total) is only met for the Inventive Examples

The invention claimed is:

1. A heterophasic propylene copolymer (HECO) comprising:
  (a) 70 to 90 wt % of a matrix (M) being a polypropylene (PP), said polypropylene (PP) comprises at least a first polypropylene fraction (PP1), a second polypropylene fraction (PP2) and a third polypropylene fraction (PP3), and having a matrix melt flow rate (MFR$_M$) as determined at 230° C. and 2.16 kg load according ISO 1133 in the range of 50.0 to 1000.0 g/10 min, and
  (b) 10 to 30 wt % of an elastomeric propylene copolymer (EPC) being a copolymer of propylene and ethylene and/or an α-olefin with 4-10 carbon atoms and being dispersed in said matrix (M), said elastomeric propylene copolymer (EPC) comprises a propylene copolymer fraction (EPC1) and optionally a second propylene copolymer fraction (EPC2),
  wherein the elastomeric propylene copolymer (EPC) is the xylene cold soluble fraction (XCS) determined at 25° C. according ISO 16152 of the heterophasic propylene copolymer (HECO) and has an intrinsic viscosity (iV) measured according to ISO 1628-1 (at 135° C. in decaline) in the range of 2.0 dl/g-4.0 dl/g,
  (c) optionally a crystalline ethylene copolymer (CEC) in an amount of 0 to 5.0 wt % with an α-olefin with 3-10 carbon atoms being present in the composition as inclusions of the dispersed particles of (b), and
  (d) 0.0001 to 0.1 wt % of a polymeric nucleating agent (PNA),
    wherein if component (d) is added in the form of a masterbatch (MB), the amount of masterbatch containing component (d) is up to 10 wt % related to the entire heterophasic propylene copolymer (HECO),
  wherein the heterophasic propylene copolymer (HECO) can comprise optional additives, and
  the sum of fractions (a), (b), (c) and (d) and optional additives is 100 wt %; and wherein
  (i) said heterophasic propylene copolymer (HECO) has a total melt flow rate (MFR$_T$) (230° C.) measured according to ISO 1133 in the range of 25.0 g/10 min to 250 g/10 min; and
  (ii) the first polypropylene fraction (PP1) has a melt flow rate MFR2 (230° C.) measured according to ISO 1133 in the range of 80.0 to 500.0 g/10 min, the second polypropylene fraction (PP2) has a melt flow rate MFR2 (230° C.) measured according to ISO 1133 in the range of 10.0 to 300.0 g/10 min, and the third polypropylene fraction (PP3) has a melt flow rate MFR2 (230° C.) measured according to ISO 1133 in the range of 2.0 to 22.0 g/10 min.

2. The heterophasic propylene copolymer (HECO) according to claim 1, wherein all three polypropylene fractions (PP1), (PP2) and (PP3) are propylene homopolymers.

3. The heterophasic propylene copolymer (HECO) according to claim 1, wherein:
  the first polypropylene fraction (PP1) is present in an amount of 30.0 to 45.0 wt %, the second polypropylene fraction (PP2 is present in an amount of 25.0 to 40.0 wt % and the third polypropylene fraction (PP3) is present in an amount of 5.0 to 20.0 wt %, all weight percentages related to the matrix and summing up to 100% of the matrix.

4. The heterophasic propylene copolymer (HECO) according to claim 1, wherein the elastomeric propylene copolymer (EPC),
  a) is a copolymer of propylene and ethylene having a total ethylene content, in the range of 25.0 to 48.0 wt %,
  b) constitutes the amount of the xylene cold soluble (XCS) fraction of the heterophasic propylene copolymer (HECO), which is in the range of 10.0 to 30.0 wt % with the heterophasic propylene copolymer, and
  c) has an intrinsic viscosity (iV) measured according to ISO 1628-1 (at 135° C. in decaline) of in the range of 1.8 to 4.0 dl/g.

5. The heterophasic propylene copolymer (HECO) according to claim 1, wherein the elastomeric propylene copolymer (EPC) is unimodal with respect to the intrinsic viscosity and/or the comonomer distribution and consists of one propylene copolymer fraction (EPC1).

6. The heterophasic propylene copolymer (HECO) according to claim 1, wherein the elastomeric propylene copolymer (EPC) consists of first propylene copolymer fraction (EPC1) and a second propylene copolymer fraction (EPC2), which differ in view of the intrinsic viscosity and/or the comonomer distribution.

7. The heterophasic propylene copolymer (HECO) according to claim 1, wherein the elastomeric propylene copolymer (EPC) consists of first propylene copolymer fraction (EPC1) and a second propylene copolymer fraction (EPC2), wherein the first elastomeric propylene copolymer fraction (EPC1) has a comonomer content in the range of 20.0-35.0 wt % and an intrinsic viscosity (iV) measured according to ISO 1628-1 (at 135° C. in decaline) of 2.0-3.2 dl/g, and the second elastomeric propylene copolymer fraction (EPC2) has a comonomer content in the range of 35.0-60.0 wt %, and an intrinsic viscosity (iV) measured according to ISO 1628-1 (at 135° C. in decaline) of 3.2-4.5 dl/g.

8. The heterophasic propylene copolymer (HECO) according to claim 1, wherein the polymeric nucleating agent present and is introduced into the heterophasic propylene copolymer (HECO) by blending with a masterbatch (MB) together with a carrier polymer or during polymerization of the heterophasic propylene copolymer (HECO) and is a vinyl polymer derived from monomers of the formula:

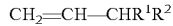

wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, or independently represent a linear or branched C4-C30 alkane, C4-C20 cycloalkane or C4-C20 aromatic ring.

9. The heterophasic propylene copolymer (HECO) according to claim 1, wherein the polymeric nucleating agent is present and is a vinyl polymer derived from monomers selected from vinyl cycloalkanes, 3-methyl-1-butene, 3-ethyl-1-hexene, 3-methyl-1-pentene, 4-methyl-1-pentene or mixtures thereof.

10. The heterophasic propylene copolymer (HECO) according to claim 1, wherein,
a) total melt flow rate ($MFR_T$) (ISO 1133; 230° C.; 2.16 kg) in the range of 25.0 to 250.0 g/10 min,
b) a total ethylene content, in the range of 5.0 to 25.0 wt %,
c) a Charpy notched impact strength of the heterophasic propylene copolymer (HECO) at 23° C. as measured according to ISO 179-1eA is in the range of 4.5 to 50.0 kJ/m², and
d) a Charpy notched impact strength of the heterophasic polypropylene composition at −20° C. as measured according to ISO 179-1eA in the range of 1.5 to 10.0 kJ/m².

11. The heterophasic propylene copolymer (HECO) according to claim 1, wherein heterophasic propylene copolymer (HECO) follows the inequation:

$$NIS(23° C.) > 13 - 2.01 \ln(MFR_T)$$

wherein NIS(23° C.) is the Charpy notched impact strength of the heterophasic polypropylene composition at 23° C. as measured according to ISO 179-1eA, and $\ln(MFR_T)$ is the natural logarithm of the total melt flow rate (ISO 1133; 230° C.; 2.16 kg).

12. The heterophasic propylene copolymer (HECO) according to claim 1, wherein the heterophasic propylene copolymer (HECO) has a puncture energy at +23° C. of at least 10.0 J determined according to ISO 6603-2 and at least −20 of at least 10.0 J determined according to ISO 6603-2.

13. The heterophasic propylene copolymer (HECO) according to claim 1, wherein the heterophasic propylene copolymer (HECO) has a tensile modulus of more than 1000 MPa, determined according to ISO 527-2 on injection ISO multipurpose moulded specimens prepared in accordance with EN ISO 1873-2.

14. The heterophasic propylene copolymer (HECO) according to claim 1, wherein the heterophasic propylene copolymer (HECO) is produced in a sequential multi-reactor polymerization process in the presence of:
a) a Ziegler-Natta catalyst comprising compounds (TC) of a transition metal of Group 4 to 6 of IUPAC, a Group 2 metal compound and an internal donor;
b) a co-catalyst (Co), and
c) optionally an external donor (ED).

15. Process for the production of a heterophasic propylene copolymer (HECO) according to claim 1, comprising polymerizing propylene in at least 3 subsequent polymerization steps in the presence of:
a) a Ziegler-Natta catalyst comprising compounds (TC) of a transition metal of Group 4 to 6 of IUPAC, a Group 2 metal compound and an internal donor,
b) a co-catalyst (Co), and
c) optionally an external donor (ED)
and introducing the polymeric nucleating agent either in a prepolymerization step or in the form of a masterbatch (MB) together with a carrier polymer.

* * * * *